United States Patent
Clark

[11] 3,827,788
[45] Aug. 6, 1974

[54] ONE-WAY MIRROR PERISCOPE REAR VISION SYSTEM

[75] Inventor: David L. Clark, Grosse Pointe Woods, Mich.

[73] Assignee: General Motors Corporation, Detroit, Mich.

[22] Filed: Mar. 30, 1973

[21] Appl. No.: 346,652

[52] U.S. Cl.............. 350/302, 88/1.5 R, 350/50, 350/301, 350/307
[51] Int. Cl. ............................................. G02b 5/08
[58] Field of Search ........................... 350/48–53, 350/301, 302, 307; 88/1.5 R

[56] References Cited
UNITED STATES PATENTS

| | | | |
|---|---|---|---|
| 1,635,011 | 7/1927 | Sadler | 350/302 |
| 2,180,013 | 11/1939 | Mihalyi | 88/1.5 R |
| 3,456,999 | 7/1969 | Hopp | 350/301 |
| 3,656,421 | 4/1972 | Ataka | 350/50 |
| 3,704,062 | 11/1972 | Toy | 350/307 |

Primary Examiner—John K. Corbin
Assistant Examiner—Michael J. Tokar
Attorney, Agent, or Firm—Peter D. Sachtjen

[57] ABSTRACT

A periscope rear vision system for viewing over the roof of a motor vehicle includes three mirrors, one of which is a one-way mirror and two of which are conventional plane mirrors. The one-way mirror located above the roof receives rearward images for redirection upwardly to one of the plane mirrors also located above the vehicle roof. This mirror reflects the images downwardly with partial transmission through the one-way mirror and an opening in the roof to the other plane mirror located in the vehicle interior and redirection therefrom to the driver.

2 Claims, 3 Drawing Figures

ONE-WAY MIRROR PERISCOPE REAR VISION SYSTEM

This invention relates to rear vision systems for motor vehicles and, in particular, to a periscopic rear vision system for viewing of the roof of the vehicle.

Rear vision systems incorporating multiple plane mirrors have been proposed for use on motor vehicles. The mirrors are arranged to provide a circuitous optical path over the roof of the vehicle to provide the driver with a rearward field of view. Generally, these systems place at least one mirror above the vehicle roof and use at least two additional mirrors to redirect the rearward images to a convenient viewing location in the passenger compartment. With such a system, however, certain problems are encountered, the foremost being that of locating the mirrors so as to avoid optical interference with one another. This can be achieved either by decreasing the size of the mirrors causing the interference or by increasing the spacing between the mirrors until the optical interference is eliminated. Each of these remedies reduces the observable rearward field of view.

The present invention provides a periscopic rear vision system which accommodates optical interference without loss of viewing field to provide a rear vision arrangement which is compact in size and in which the supplemental mirrors are located above the roof of the vehicle while a conventional location is used for the driver observed mirror. More particularly, a one-way partially optically transmissive mirror serves both to redirect rearward images to a second mirror and allow the reflected images from the second mirror to pass therethrough for redirection by another mirror to the driver. The one-way mirror is located above the vehicle roof and receives images from the desired rearward field of view. The one-way mirror is positioned to direct these images upwardly onto a second mirror also positioned above the roof of the vehicle. The second mirror and the one-way mirror are aligned with respect to an opening in the vehicle roof and also with respect to a third mirror positioned in a conventional viewing location interior of the vehicle. The images from the second mirror is directed downwardly onto the first mirror element. Inasmuch as this is partially reflective, the images are partially transmitted therethrough onto the third mirror for reflection to the driver. With the two mirrors located above the vehicle roof, the third mirror is located in a conventional easy to observe location, unlike other periscopic systems which require a special inconvenient location for the observed mirror. By locating the supplemental mirrors above the vehicle roof, no extra intrusion of the optical system into the passenger compartment is required.

The above and other features of the present invention will be apparent to one skilled in the art upon reading the following detailed description, reference being made to the accompanying drawings illustrating a preferred embodiment of the present invention in which.

Figure 1:
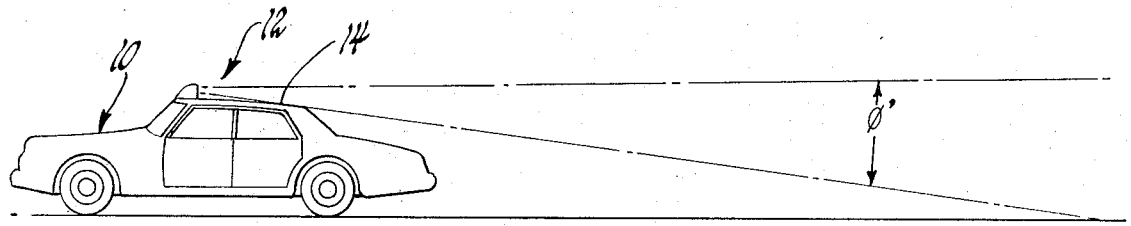
FIG. 1 is a side elevational view of a motor vehicle incorporating a one-way mirror periscope rear vision system made in accordance with the present invention.

Referring to the drawings, a motor vehicle 10 includes a one-way mirror periscope rear vision system 12 for providing a rearward viewing angle $\phi'$ (Theta) over the roof 14 of the vehicle.

Figure 2:
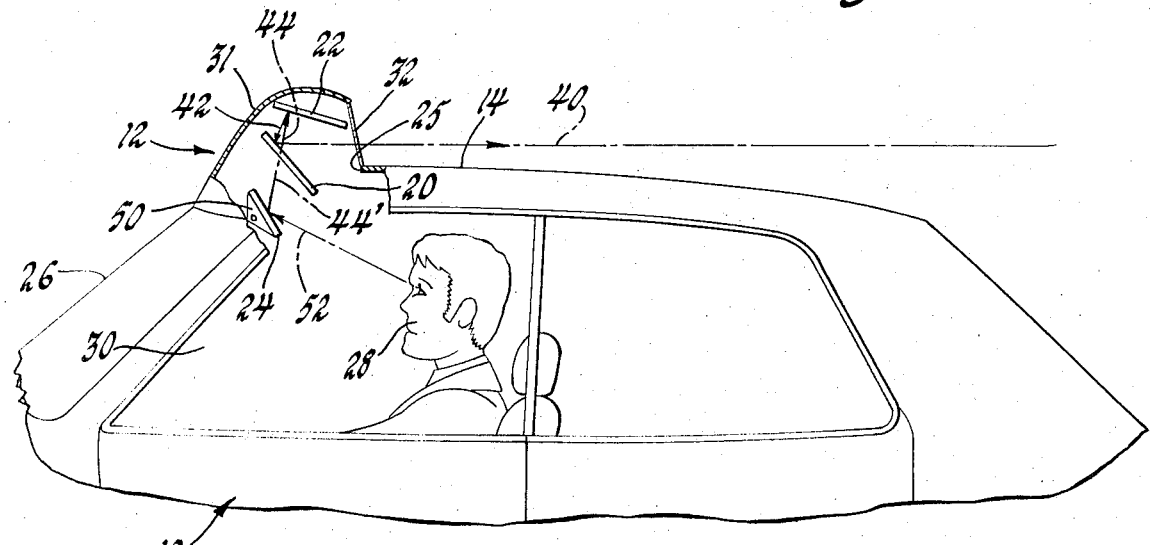
FIG. 2 is an enlarged partially sectioned view of the rear vision system shown in FIG. 1.

The rear vision system 12 as shown in FIG. 2 comprises a one-way mirror 20, an upper conventional plane mirror 22, and a lower conventional plane mirror 24. The rear vision system 12 is generally disposed within an opening 25 in the vehicle roof 14 adjacent the vehicle windshield 26. The system 12 provides a driver 28 positioned in the vehicle passenger compartment 30 with a sight path over the vehicle roof along the median viewing lines indicated by the arrows. The system 12 is covered by a frontal shroud 31 having a rearward opening closed by a cover glass 32.

The one-way mirror 20 is a partially transmissive, partially reflective device. In other words, light rays impinging its reflective surface will be partially reflected therefrom and partially transmitted therethrough. The opposed surface is partially transmissive substantially non-reflective. The mirror element 20 is positioned almost entirely above the vehicle roof 14 and is forwardly and upwardly inclined with respect to the rear of the vehicle. The rearward surface of the mirror 20 is provided with a partially reflective coating. By means of suitable supports the mirror 20 is laterally fixedly positioned within the opening 24. Images from the rear of the vehicle are represenatively indicated as traveling along ray 40 to the mirror 20. The images are partially reflected at the one-way mirror 20 upwardly along ray 42 and partially transmitted therethrough along ray 42.

The upper mirror or second mirror 22 is substantially horizontally positioned above the one-way mirror 20. The mirror 22 is fixedly positioned in the shroud 30 and has its reflective surface facing the mirror 20. The mirror 22 serves to redirect images received from the one-way mirror 20 downwardly along ray 44 onto the optically interfering one-way mirror 20. Similar to the first described reflection the images along ray 44 are partially reflected by the one-way mirror 20 and partially transmitted therethrough along ray 44'.

The mirror 24 is adjustably laterally positioned adjacent the windshield 26 on a pivotable bracket 50. The mirror 24 is conventionally located in the passenger compartment 30 adjacent the upper portion of the windshield 26. The mirror 24 is inclined upwardly to receive the images from the second mirror 22 along ray 44 and to reflect the same along ray 52 to the driver 28. With this arrangement, the two supplemental mirrors 20 and 22 are located above the vehicle roof 14 exterior of the passenger compartment 30 and therefore cannot intrude into the occupant area. The mirror 24 being located in a conventional location does not require excessive head movements for viewing. Further, inasmuch as the mirror 20 is permitted to be an optical interference with the other mirrors an extremely compact viewing arrangement is provided for viewing over the roof of the vehicle.

Figure 3:
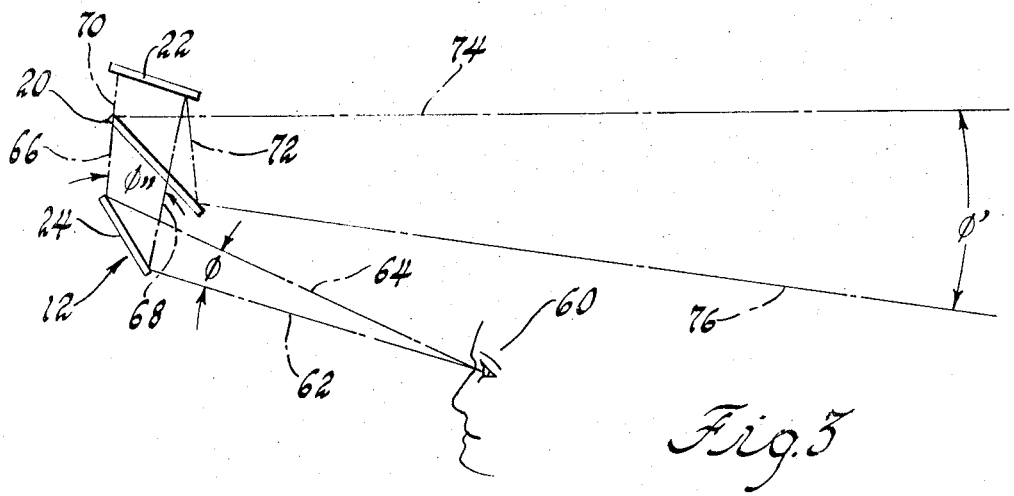
FIG. 3 is a schematic view illustrating the routing of the images through the rear vision system.

The rear vision system 12 is schematically illustrated in FIG. 3. Therein the mirrors 20, 22 and 24 are shown in the irrespective locations. An observer 60 will view the third or primary mirror 24 with a viewing angle $\phi$ equal to the desired overall viewing angle $\phi'$ provided over the roof of the vehicle as shown in FIG. 1. This viewing angle $\phi$ is described by rays 62, 64 and is observed upwardly at mirror 22 as described along sight lines 66, 68 which also subtend a viewing angle $\phi''$ equal to the observed sight path $\phi'$. This sight path is then observed at the one-way mirror 20 along sight line 70 and 72 and for ultimate rear viewing along sight lines 74, 76. The sight lines 74, 76 define the aforementioned rearward field of view $\phi'$. The lower sight line 76 interferes with the roof 14 to provide vehicle referencing in the field of view.

Although only one form of this invention has been shown and described, other forms will be readily apparent to those skilled in the art. Therefore, it is not intended to limit the scope of this invention by the embodiment selected for the purpose of this disclosure but only by the claims which follow.

What is claimed is:

1. A periscopic rear vision system for a motor vehicle having a roof with an opening therein, said rear vision system comprising: a partially reflective first mirror member positioned above said roof and said opening, said first mirror member being inclined forwardly for receiving images rearward of the motor vehicle and reflecting the images upwardly; a second mirror member positioned substantially horizontally above said first mirror member for receiving images reflected from the latter, said second mirror member reflecting said images downwardly onto said first mirror member and with partial transmission therethrough; a third mirror member positioned interior of the motor vehicle below said first and second mirror members for receiving images reflected by said first mirror member, said third mirror member being forwardly inclined for reflecting said images to a dirver of said motor vehicle thereby providing the driver with a rearward field of view over the vehicle roof.

2. In a motor vehicle having a roof with an opening therein and a windshield adjacent the opening, a periscopic rear vision system comprising: a lower mirror positioned interior of the motor vehicle adjacent the windshield and forwardly inclined for viewing by the driver of the vehicle; an upper mirror horizontally positioned over said opening above said lower mirror and said roof for downwardly reflecting images onto said lower mirror for redirection to the driver; a partially reflective one-way mirror positioned above said roof and said opening in physical and optical interference between said upper and lower mirrors, said one-way mirror being forwardly inclined for receiving images rearward of the motor vehicle and upwardly reflecting the images to said upper mirror, the images downwardly reflected by said upper mirror being partially transmitted through said one-way mirror to said lower mirror for reflection to said driver thereby providing the driver with a rearward field of view over the vehicle roof.

* * * * *